United States Patent [19]

Goto

[11] Patent Number: 4,689,462

[45] Date of Patent: Aug. 25, 1987

[54] WIRE CUTTING TYPE ELECTRICAL DISCHARGE MACHINING SYSTEM

[75] Inventor: Makoto Goto, Toki, Japan

[73] Assignee: Brother Kogyo Kabushiki Kaisha, Japan

[21] Appl. No.: 705,532

[22] Filed: Feb. 26, 1985

[30] Foreign Application Priority Data

Mar. 5, 1984 [JP] Japan .................................. 59-42287
   Mar. 13, 1984 [JP] Japan ................................ 59-36430

[51] Int. Cl.[4] .......................... B23H 1/02; B23H 7/04
[52] U.S. Cl. .................................. 219/69 W; 204/206; 204/224 M; 219/69 C
[58] Field of Search ............... 219/69 W, 69 E, 69 M, 219/69 S, 69 R, 68; 204/206, 224 M

[56] References Cited

U.S. PATENT DOCUMENTS

| 3,927,293 | 12/1975 | Bell, Jr. | 219/69 C |
| 4,298,781 | 11/1981 | Inoue | 219/69 W |
| 4,412,118 | 10/1983 | Nomura et al. | 219/69 W |

FOREIGN PATENT DOCUMENTS

| 41383 | 12/1981 | European Pat. Off. | 219/69 W |
| 53-68496 | 6/1978 | Japan | 219/69 W |
| 53-84295 | 7/1978 | Japan | 219/69 W |
| 157432 | 12/1980 | Japan | 219/69 W |
| 57-71725 | 5/1982 | Japan | 219/69 S |
| 149126 | 9/1982 | Japan | 219/69 W |
| 58-94930 | 6/1983 | Japan | 219/69 W |
| 109227 | 6/1983 | Japan | 219/69 W |
| 126025 | 7/1983 | Japan | 219/69 W |
| 202726 | 11/1983 | Japan | 219/69 S |
| 59-19635 | 2/1984 | Japan | 219/69 C |
| WO80/01545 | 8/1980 | PCT Int'l. Appl. | 219/69 W |
| 965695 | 10/1982 | U.S.S.R. | 219/69 W |

*Primary Examiner*—A. D. Pellinen
*Assistant Examiner*—Geoffrey S. Evans
*Attorney, Agent, or Firm*—Parkhurst & Oliff

[57] ABSTRACT

A wire cutting type electrical discharge machining system includes a wire supply device, an upper and lower electrode guides, and a wire take-up device for feeding a wire electrode so as to carry out the discharge machining on an electrically conductive workpiece. An improved wire-disconnection detecting device attached to the system includes a first and second wire-slack detecting members of metallic tube through which the wire is passed with a small distance formed therebetween, a wire-disconnection detecting circuits connected between the detecting members and the wire, including a power supply, and a sensor for sensing a flow of current from the power supply through the detecting members and the wire upon contact of the two due to a slack of the wire. A disconnection of the wire is detected when the flow of current is sensed by the sensor.

16 Claims, 3 Drawing Figures

WIRE CUTTING TYPE ELECTRICAL DISCHARGE MACHINING SYSTEM

FIELD OF THE INVENTION

This invention relates to a wire cutting type electrical discharge machining system for cutting an electrically conductive workpiece by means of an electrode in the form of a metallic wire which is continuously fed lengthwise relative to the workpiece, and more particularly to an electrical discharge machining system provided with a wire-disconnection detecting device for detecting a disconnection of the wire.

BACKGROUND OF THE INVENTION

Example of a wire-disconnection detecting device for such a wire cutting type electrical discharge machining system, are disclosed in the TOKU-KAI-SHO 53 (1978)-68496 (a laying-open publication of a Japanese patent application). In FIG. 3 of the publication one device is illustrated which includes a detecting power supply separate from a machining power supply, and a detector to sense the disconnection of the wire electrode. The detecting power supply gives a small amount of current to the wire electrode through a pair of power-supply contacts disposed above and below a work table for supporting the workpiece, and the detector detects a variation of the current between the two power supply contacts upon disconnection of the wire electrode. FIG. 4 in the same publication shows another device wherein a current transformer is disposed, in place of the detector of FIG. 3, adjacent to the wire at a portion located between the pair of power supply contacts. FIG. 4 also shows another device wherein the current transformer is also provided, but a machining power source is connected to both the power-supply contacts. In those devices, wire-disconnection is detected by sensing the absence of a current flow through the wire electrode.

If the device of FIG. 3 is adapted such that the machining power source is connected to both of the power-supply contacts, the small amount of current flows through the power line of the machining power supply circuit in the event of disconnection of the wire electrode, with a disadvantageous result of preventing the wire-disconnection detection by the detector. The device of FIG. 4 is problematic, because the output signal, which is generated upon detection by the current transformer of a variation of the current through the wire electrode, is weak. This means that the output of the current transformer must be amplified by a costly means such as an amplifier. It is true that when the machining power source is connected to the upper and lower power-supply contacts in addition to the installation of the current transformer for current detecting, strong output signal can be obtained, and such a disadvantage as observed in the device shown in FIG. 3 can be prevented, i.e., a wire-disconnection in the device, in which the machining power source is connected to the upper and lower power-supply contacts, will not change the closed state of the detector circuit, which naturally prevents detection of the wire-disconnection. In other words, the above arrangement is of some merit per se, but the application of this type of detecting arrangement is limited to a machining system wherein the machining power supply is connected to the upper and lower power-supply contacts.

SUMMARY OF THE INVENTION

It is accordingly an important object of the invention, which was made from such a background, to provide a unique wire cutting type electrical discharge machining system having a wire-connection detecting device constructed by an absolutely different technological idea from that in the wire-disconnection detecting device disclosed in the publication of the TOKU-KAI-SHO 53-68496.

According to the present invention, there is provided a wire cutting type electrical discharge machining system for removing metal by means of an electrode in the form of a metallic wire which is continuously fed lengthwise relative to electrically conductive workpiece, which system comprises, as described below in detail, at least one wire-slack or -looseness detecting member and wire-disconnection detecting circuit.

The wire-slack detecting member is made of an electrically conductive material, and disposed along a feed path of the metallic wire such that the metallic wire is held a slight distance away from the detecting member while the metallic wire is normally tensioned, but brought into contact with the detecting member when the metallic wire is slacked or loosened. The wire-disconnection detecting circuit is connected between the detecting member and the metallic wire and the circuit includes a power supply and a wire-disconnection detector for sensing a flow of current from the power supply through the detecting member and the metallic wire upon contact thereof.

In a wire cutting type electrical discharge machining system according to the invention, constructed in the above-mentioned manner, electric current is not normally flowed in the wire-disconnection detecting circuit, but flowed only when a slacked wire due to a wire-disconnection comes into contact with the wire-slack detecting member, causing as a result detection of the wire-disconnection. In other words, the wire-disconnection is detected by the slack of the metallic wire upon its disconnection. This wire-disconnection detecting device is categorically different, in its technological principle, from that disclosed in the publication of the TOKU-KAI-SHO 53-68496, wherein wire-disconnection is detected by an interruption of the current which is normally flowed through the wire.

Owing to the above-mentioned structure, several technological problems inherent to the wire-disconnection detecting devices mentioned in the publication can be solved. Impossibility of detection of the wire-disconnection in one case shown in FIG. 3, caused by the connecting way of the machining power supply, can be prevented. Difficulty of wire-disconnection detection caused by the feebleness of the output signal issued in response to the small amount of current flow through the metallic wire can also be eliminated. The wire-disconnection can thus be surely detected by the device of the present invention. Another merit of the device resides in dispensing with a costly amplifier, etc. In the device according to the present invention, the wire-slack detecting member is kept a small distance away from the wire while the wire is in a tension state, which naturally keeps the wire-disconnection detecting circuit separated from the power source for the electrical discharge machining. Due to the arrangement of the device, electric wiring through the whole device can enjoy a high degree of freedom, i.e., being scarcely restricted to a great advantage.

Another object of the invention is to make the wire-disconnection detecting device highly improved one, wherein wire-disconnection can be almost perfectly detected no matter in what direction the wire slacks or bends in case of a wire-disconnection.

This object can be achieved by means of making the detecting member a metallic tube through which the metallic wire is passed.

For enhancing reliability or certainty of the wire-disconnection detection, the invented device is preferably applied to an electrical discharge machining system which comprises a wire supply device to supply the metallic wire, an upper and a lower electrode guide for guiding the metallic wire along the feed path, and a wire take-up device to take up the metallic wire. And the afore-mentioned at least one wire-slack deteting member consists of a first detecting member disposed between the wire supply device and the upper electrode guide, and a second detecting member disposed between the lower electrode guide and the wire take-up device.

Due to this arrangement probability of the contact between a broken or loosened wire and the wire-slack detecting member is greatly enhanced no matter in what portion the wire is disconnected. Making in this instance the wire-slack detecting member tubular, as stated before, will contribute to further high degree wire-disconnection detection.

In another embodiment of the present invention, the first and second detecting members are electrically connected to each other, and the wire-disconnection detecting circuit is electrically connected commonly to the first and second detecting members.

Owing to this arrangement only one wire-disconnection detecting circuit will do, which brings about a merit of simplifying the electric circuit in the device.

The wire-disconnection detecting circuit may be provided for each of the first and second detecting members.

In still another advantageous embodiment of the invention, the electrical discharge machining system comprises a main control device for controlling electrical discharge between the metallic wire and the workpiece, and controlling movement of the metallic wire relative to the workpiece, and further comprises an interruption circuit for commanding the main control device to interrupt the electrical discharge and the relative movement of the metallic wire in response to a wire-disconnection signal from the wire-disconnection detecting circuit.

By means of taking such a structure, the electrical discharge machining system of this invention can be automatically stopped in response to a signal of wire-disconnection detection issued from the wire-disconnection detecting circuit in case of a wire-disconnection. It is very effective in the event the electrical discharge machining is automatically operated.

In still another embodiment of the present invention the wire-disconnection detecting device comprises a light emitting diode connected in series to the power supply, and the interruption circuit comprises a phototransistor which is turned on in response to emission of light of the light emitting diode, thereby applying an interruption signal to the main control device. And the light emitting diode and the phototransistor may be disposed at a distance from each other, the light of the light emitting diode being transferred to the phototransistor through an optical fiber.

In this arrangement it is possible to dispose the wire-disconnection detecting device and the interruption circuit with a distance from each other, which enhances the degree of freedom in the designing of the electrical discharge machining system.

In another aspect of the invention relative positions of the upper and lower electrode guides are adjusted along mutually perpendicular X and Y axes in a horizontal plane. The electrical discharge machining of the workpiece is effected at a portion of the metallic wire which extends between the upper and lower electrode guides. And the electrical discharge machining system further comprise a work table movable along the X and Y axes, a first and a second verticality sensing member, and a first and a second verticality checking circuit. The first and second verticality sensing members are supported by the work table so as to check the verticality of the portion of the metallic wire extending between the upper and lower electrode guides. The first and second verticality sensing members have a first and a second pairs of sensing surfaces, respectively, each of the first and second pairs consisting of an X-sensing surface and Y-sensing surface. The two X-sensing surfaces are spaced apart from each other in a vertical plane perpendicular to the X axis, while the two Y sensing surfaces are spaced apart from each other in another vertical plane perpendicular to the Y axis. The first verticality checking circuit is connected between the first verticality sensing member and the metallic wire. The circuit comprises a power supply, and a first verticality detector for sensing a flow of current from the power supply through the first verticality sensing member and the metallic wire, upon contact thereof. The second verticality checking circuit is connected between the second verticality sensing member and the metallic wire. The circuit comprises a power supply, and a second verticality detector for sensing a flow of current from the power supply through the second verticality sensing member and the metallic wire upon contact thereof.

Such an arrangement makes it possible to maintain the wire vertical based on desirable contact state between the two verticality sensing members, the first and the second, and the wire.

In still another desirable embodiment, the wire-disconnection detecting circuits are connected, selectively via switching means, to the first and second wire-slack detecting members, respectively, or alternatively to the first and second verticality sensing members, respectively.

By means of arranging in this way, the first and the second wire-disconnection detecting circuits can function at the same time as the first and second verticality checking circuits, so that the resulting electrical discharge machining system is of high performance for its simple structure and low manufacturing cost.

BRIEF DESCRIPTION OF THE DRAWING

The aforementioned objects and features of the invention as well as advantages thereof will become more readily apparent from the following description taken with reference to the accompanying drawing in which.

DETAILED DESCRIPTION OF THE PREFERRED EMBODIMENTS

The first embodiment of this invention will be described in detail with reference to the accompanying drawing.

Figures 1, 3:
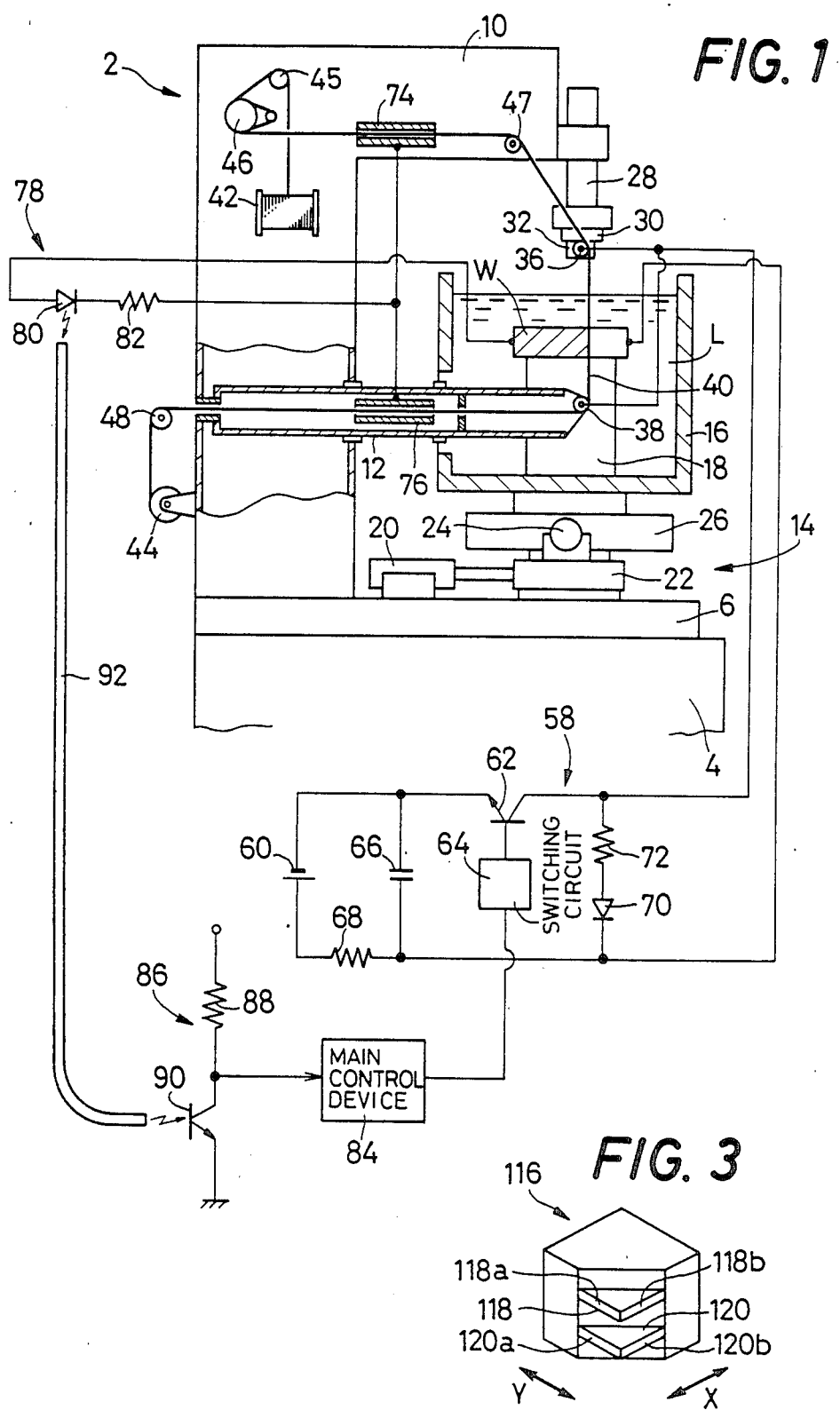
FIG. 1 is an elevational view, partially in section, of the first embodiment of the wire cutting type electrical discharge machining system according to this invention, accompanied with an electric circuit attached thereto.
FIG. 3 is an enlarged perspective view of the wire position sensing device in the second embodiment of this invention.

A wire cutting type electrical discharge machining system according to the present invention is provided with a frame 2, as can clearly be seen in FIG. 1, which frame 2 includes in turn a base 4, a bed 6 mounted thereupon, a column 8 which is disposed on top of one end portion of the bed 6, an upper arm 10 extending horizontally from the upper end of the column 8 rightward in respect to FIG. 1, and a lower arm 12 extending in parallel with the upper arm 10 from the middle portion of the column 8. On the bed 6 there is disposed a work pan 16 filled with machining fluid therein, by way of an X-Y feed device 14, movably in a horizontal plane. On the bottom wall of the work pan 16 a table 18 for supporting an electrically conductive workpiece W is disposed. The above-mentioned X-Y feed device 14 is provided with a Y-slide 22 mounted on the bed 6, movably in Y-axis direction, i.e., leftward and rightward direction, by the action of a Y-feed motor 20, and an X-slide 26 mounted on the Y-slide 22, movably in X-axis direction perpendicular to Y-axis, i.e., forward and backward direction, by the action of an X-feed motor 24. The workpiece W can be, due to the combined operation of the Y-slide 22 and the X-slide 26, fed to any desired direction in the horizontal plane.

On the tip of the upper arm 10 located above the work pan 16 a height adjustable head 28 is attached. To the lower side of the head 28 another X-slide 30, which is movable in the same direction as the X-slide 26, is mounted with not-shown adjustable screw; to the lower side of the X-slide 30 another Y-slide 32, which is movable in the same direction as the Y-slide 22, is mounted with similar not-shown adjustable screw. To the Y-slide 32 an upper electrode guide 36 with an electrically conductive roller is attached in an electrically insulated state with respect to the Y-slide 32. This upper electrode guide 36 is position adjustable in its height and X- and Y-axial directions due to ascending and descending of the head 28, and axial displacement of the X-slide 30 and the Y-slide 32.

The lower arm 12 extends on the other hand passing through one side wall of the work pan 16, fluid-tightly and movably relative to the side wall, as far as a position just beneath the workpiece W. The lower arm 12 is a tubular member, made of an electrically conductive material, being fixed at its root portion on to the column 8 at an electrically insulated state therefrom. On the tip of the lower arm 12 a lower electrode guide 38 having an electrically conductive roller is mounted at an electrically insulated state therefrom.

Relative positions, between the upper electrode guide 36 and the lower electrode guide 38, in a horizontal direction are adjustable along mutually perpendicular X- and Y-axes directions. Machining of the workpiece W is therefore performed by a portion of the wire extending substantially vertically between the upper electrode guide 36 and the lower electrode guide 38.

On the upper portion of the column 8 a wire supply device 42 is disposed for supplying a wire electrode 40 constituted of a metallic wire. On the lower portion of the column 8 a wire take-up device 44 for winding up the wire electrode 40 is disposed. The wire electrode 40 fed from the wire supply device 42 is, by way of guide rollers 45, 46, 47 and the upper electrode guide 36, continuously delivered downwardly to the machining space in the work pan 16. The already worked portion of the wire electrode 40 is recovered or collected to the wire take-up device 44 by way of the lower electrode guide 38 and a guide roller 48.

To the wire electrode 40 and the workpiece W a power circuit 58 is connected for repeatedly generating pulse discharge between the two (40.W). The then produced discharge energy is used for the machining of the workpiece W. Speaking more specifically, to one terminal of a DC power supply 60 is connected a source terminal of a field-effect transistor 62; to the gate terminal thereof is connected a switch circuit 64 for controlling the switching operation of the transistor 62.

Between the source terminal of the transistor 62 and the other terminal of the DC power supply 60 a capacitor 66 and a resistor 68 are connected so as to stabilize the power supply to the transistor 62. And between the drain terminal of the transistor 62 and the other terminal of the DC power supply 60 a diode 70 and a resistor 72 are connected so as to erase the reactance generated in response to the switching operation of the transistor 62. The wire electrode 40 is connected via the upper and lower electrode guides 36, 38 to the drain terminal of the transistor 62, and the workpiece W is connected to the other terminal of the Dc power source 60.

The wire-disconnection detecting device will be described in detail below. In a guided passage for the wire electrode 40 consisting of the wire supply device 42, the guide rollers 45, 46, 47, the upper electrode guide 36, the lower electrode guide 38, the guide roller 48, and the wire take-up device 44, between the guide rollers 46 and 47, and between the lower electrode guide 38 and the guide roller 48, a wire-slack or -looseness detecting member 74 and another wire-slack detecting member 76, made of an electrically conductive metallic tubular member, are respectively disposed. They are both electrically insulated with respect to the frame 2. Through the tubular members 74, 76, the wire electrode 40 are passed in a tense state with a slight distance spaced from the inside surface thereof. The upper and lower electrode guides 36, 38 retain, even in case of a wire-disconnection, the wire electrode 40 such that the electrical conduction between the two is preserved by means of keeping contact thereto.

Between the wire-slack detecting members 74, 76 and the wire electrode 40 a wire-disconnection detecting circuit 78 is connected. The wire-slack detecting members 74, 76 are electrically conductively connected to each other, and the wire-disconnection detecting circuit 78 is commonly connected to each of the two (74, 76). The wire-disconnection detecting circuit 78 is supplied its power by the DC power supply 60 in the power circuit 58, and is provided with a light emitting diode 80 as a wire disconnection detector and a resistor 82. When therefore the wire electrode 40 is disconnected at the discharge machining position to the workpiece W, i.e., relieved from the tense state, the wire electrode 40 will contact the wire-slack detecting member 74 and/or the wire-slack detecting member 76 to form a closed circuit starting from the power circuit 58, passing through the workpiece W, the wire-disconnection detecting circuit 78, the wire-slack detecting members 74, 76, and the wire electrode 40, up to the DC power supply 60. It causes the light emitting diode 80 to emit light.

To the switching circuit 64 of the power circuit 58 a main control device 84 is connected, which controls via the switching circuit 64 switching operation of the field effect transistor 62, the electrical discharge between the wire electrode 40 and the workpiece W being thereby controlled. The main control device 84 controls not only the relative movement between the wire electrode 40 and the workpiece W, through the controlling of the X-feed motor 24 and the Y-feed motor 20, but also operation of the wire take-up device 44. To the main control device 84 an interruption circuit 86 for stopping the discharge machining based on a wire-disconnection detecting signal from the wire-disconnection detecting circuit 78 is connected. The interruption circuit 86 is provided with a phototransistor 90 impressed with the predetermined voltage through a resistor 88.

The phototransistor 90 is connected between the wire-slack detecting member 74, 76 and the wire electrode 40, to which phototransistor 90 light from the light emitting diode 80, which is located some distance away therefrom, is introduced through an optical fiber 92. When the phototransistor 90 is turned on due to light emitting from the light emitting diode 80, power supplying from the DC power supply 60, the displacement of the workpiece W and the feeding of the wire electrode 40 are interrupted, owing to the control by the main control device 84. It means stoppage of the electrical discharge machining itself.

In a wire cutting type electrical discharge machining system of such structure, a wire-disconnection in the course of discharge machining will cause the slackened wire electrode 40 to contact the wire-slack detecting members 74, 76, and resulting current flow from the power circuit 58 to the wire-disconnection detecting circuit 78 makes the light emitting diode 80 to emit light. It will cause, via the optical fiber 92, the phototransistor 90 to turn on, which in turn stops the electrical discharge machining through the action of the main control device 84.

In this emobdiment of the wire cutting type electrical discharge machining system a breaking or disconnection of the wire electrode 40 can surely be detected so as to instantly interrupt the discharge machining operation. This detection is made, even when the power circuit 58 is connected only to the upper electrode guide 36, without any hitch. In this case however the wire-slack detecting member 76 is omitted.

Figure 2:
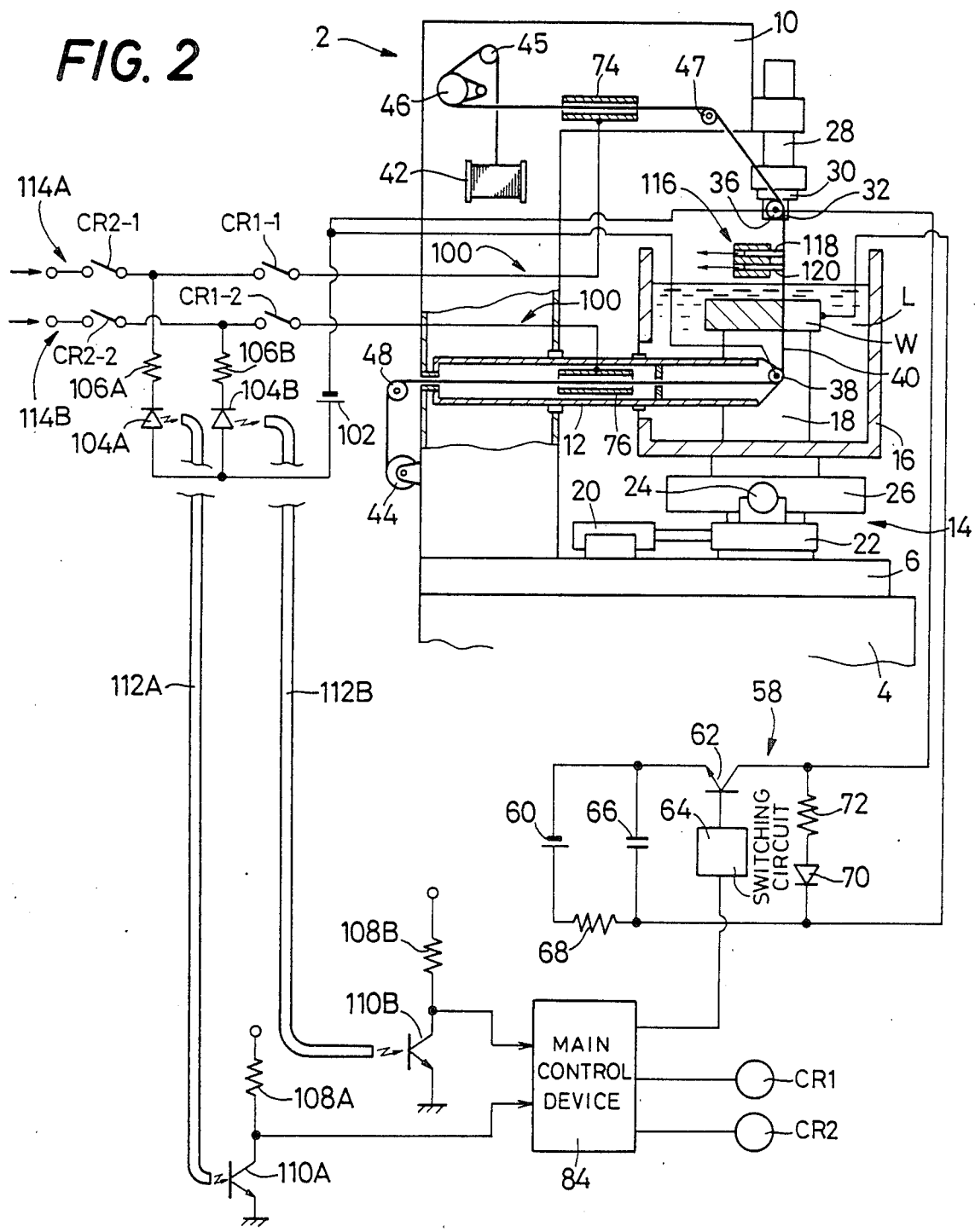
FIG. 2 is a similar view to FIG. 1 in respect to the second embodiment of this invention.

The second embodiment of this invention will be described next with reference to FIGS. 2 and 3. This embodiment is different from the first embodiment, particularly in its structure in wire-disconnection detecting circuits and vertically checking circuits. In this embodiment, each of the wire-slack detecting members 74, 76 is respectively provided with an independent wire-disconnection detecting circuit 100, 100. The two circuits 100 have a common detecting power source 102 connected to the upper and lower electrode guides 36, 38. Between the power source 102 and the upper wire-slack detecting member 74 a light emitting diode 104A, a resistor 106A, a relay switch CR1-1 of a wire-slack detecting relay CR1 are connected. Between the power source 102 and the lower wire-slack detecting member 76 a light emitting diode 104B, a resitor 106B, a relay switch CR1-2 of the wire-slack detecting relay CR1 are connected. To the main control device 84, in this embodiment, a pair of phototransistors 110A, 110B, which have respectively been impressed with a predetermined voltage, by way of a resistor 108A, 108B, are connected. Those phototransistors 110A, 110B receive light from the light emitting diodes 104A, 104B, respectively through a pair of independent optical fibers 112A, 112B. The wire-slack detecting relay CR1 is, during the discharge machining, excited by the main control device 84 so as to cause both relay switches CR1-1, CR1-2 to close.

The table 18 is, in this embodiment, provided further via not-shown bracket or the like with a wire position sensing device 116 for making the wire electrode 40 vertical. The device 116 can be displaced in a horizontal plane, in response to the movement of the table 18, along X- and Y axes. The wire position sensing device 116 is, as shown in FIG. 3, provided with a pair of verticality sensing members 118, 120, which are respectively connected, by way of a pair of relay switches CR2-1, CR2-2 of a position sensing relay CR2, to the junctions between the pair of relay switches CR1-1, CR1-2 and the resistors 106A, 106B. Those verticality sensing members 118, 120 are respectively provided with a pair of mutually perpendicular surfaces, i.e., an X-sensing surface 118a and a Y-sensing surface 118b, and an X-sensing surface 120a and a Y-sensing surface 120b. And the verticality sensing members 118a, 120a are separatedly arranged from each other with a distance in a vertical direction. Each of the X-sensing surfaces 118a, 120a is located in a vertical plane perpendicular to the X-axis, and each of the Y-sensing surfaces 118b, 120b is located in a vertical plane to the Y-axis.

In this embodiment of the wire cutting type electrical discharge machining system, a wire-disconnection during the discharge machining operation, while the relay switches CR1-1, CR1-2 are closed due to the excitation of the wire-slack detecting relay CR1, will cause the slackened wire to contact with the wire-slack detecting members 74 and/or 76. This will in turn cause the light emitting diode 104A and/or 104B to emit light, with a subsequent operation of the phototransistors 110A and/or 110B. Power supplying from the power circuit 58 is naturally interrupted by the main control device 84 so as to cease the discharge machining. A wire-disconnection can be surely sensed in this embodiment, just like in the previous first embodiment, so as to timely cease the discharge machining operation.

Before starting the discharge machining operation, the relay switches CR1-1, CR1-2, CR2-1, and CR2-2 are open. In order to make the posture of the wire electrode 40 vertical between the upper and lower electrode guides 36, 38, in this system, the operator pushes a button for causing the main control device 84 to excite the position sensing relay CR2. The relay switches CR2-1, CR2-2 will thereby be closed. In this state the verticality sensing members 118, 120 are respectively connected to the wire-disconnection detecting circuits 100, both functioning as a verticality sensing circuit. The light emitting diodes 104A, 104B work as verticality sensors by deteting current flows through the verticality sensing members 118, 120.

After the wire position sensing device 116 has been arranged such that each of the X-sensing surfaces 118a, 120a of the verticality sensing members 118, 120 faces with the wire electrode 40, the upper electrode guide 36 is displaced such that the wire electrode 40 is slightly turned around the lower electrode guide 38 so as to make the distance between the wire electrode 40 and the upper X-sensing surface 118a slightly smaller than that between the wire electrode 40 and the lower X-sensing surface 120a. Subsequently the table 18 is manually moved with the wire position sensing device 116 along the X axis. Then the upper X-sensing surface 118a contacts the wire electrode 40 followed by contacting of the lower X-sensing surface 120a with the wire electrode 40. Contacts of the wire electrode 40 with the X-sensing surfaces 118a, 120a will flow currents, via the wire electrode 40, to verticality sensing circuits 114A, 114B, which lights the light emitting diodes 104A, 104B. The operator can instantly stop the table 18 simultaneously with the lighting of the light emitting diode 104B which is caused by the contact between the lower X-sensing surface 120a with the wire electrode 40. Then the upper electrode guide 36 is moved in a departing direction away from the wire position sensing device 116, a slight separation of the wire electrode 40 from the upper X-sensing surface 118a puts out the light emitting diode 110A. The upper electrode guide 36 must be stopped at once of its motion. The wire electrode 40 can be placed in a vertical plane perpendicular to the X-axis. After, then, the Y-sensing surfaces 118b, 120b having been faced to the wire electrode 40, a similar operations is performed in respect to the Y-axis. When the wire electrode 40 is thereby positioned in a vertical plane perpendicular to the Y-axis, the wire electrode 40 is postured right vertical.

The verticality of the wire electrode 40, between the upper and lower wire electrode guides 36, 38, can be easily secured in this way through displacement of the upper electrode guide 36 and the wire position sensing device 116.

In this embodiment of the wire cutting type electrical discharge machining system, appropriate excitement of the relays CR1, CR2 allows selective connection of the verticality sensing members 118, 120 and the wire-slack detecting members 74, 76 to the wire-disconnection detecting circuits 100. The wire-disconnection detecting circuits 100 can thereby function concurrently as a verticality sensing circuit. It contributes greatly to the cost reduction of the system due to its simplified structure.

It will be obvious to those skilled in the art that various changes may be made without departing from the scope of the invention and the invention is not to be considered limited the illustrated embodiment shown in the drawings and described in the specification.

What is claimed is:

1. A wire cutting type electrical discharge machining system for removing metal by means of an electrical discharge energy between an electrically conductive workpiece and an electrode in the form of a metallic wire which is continuously fed lengthwise relative to the workpiece, comprising:
    at least one wire-slack detecting member made of an electrically conductive material, and disposed along a feed path of said metallic wire such that the metallic wire is held a slight distance away from said detecting member while the metallic wire is normally tensioned, but brought into contact with said detecting member when the metallic wire is slacked; and
    a wire-disconnection detecting circuit including (a) a power circuit connected between each of said at least one detecting member and said metallic wire, said power circuit being connected to said metallic wire at a position between each detecting member and said workpiece, and (b) a wire-disconnection detector for sensing a flow of current from said power circuit through said metallic wire and at least one of said at least one detecting member upon contact of said metallic wire with said at least one of said at least one detecting member, said wire-disconnection detector generating a wire-disconnection signal indicative of a disconnection of said metallic wire when said flow of current is sensed by said wire-disconnection detector.

2. The electrical discharge machining system of claim 1, wherein each of said at least one detecting member comprises a metalic tube through which said metallic wire is passed.

3. The electrical discharge machining system of claim 1, further comprising
    a wire supply device to supply said metalic wire, an upper and a lower electrode guide for guiding said metallic wire to and from said workpiece, respectively, along said feed path, and a wire take-up device to take up said metallic wire,
    said at least one wire-slack detecting member consisting of a first detecting member disposed between said wire supply device and said upper electrode guide, and a second detecting member disposed between said lower electrode guide and said wire take-up device.

4. The electrical discharge machining system of claim 3, wherein said first and second detecting members are electrically connected to each other, and said wire-disconnection detecting circuit is electrically connected commonly to said first and second detecting members.

5. The electrical discharge machining system of claim 3, wherein said wire-disconnection detecting circuit is provided for each of said first and second detecting members.

6. The electrical discharge machining system of claim 1, further comprising a main control device for controlling electrical discharge between said metallic wire and the workpiece, and controlling a movement of said metallic wire relative to the workpiece, and further comprising an interruption circuit for commanding said main control device to interrupt the electrical discharge and the relative movement of said metallic wire in response to said wire-disconnection signal from said wire-disconnection detecting circuit.

7. The electrical discharge machining system of claim 6, wherein said wire-disconnection detector comprises a light emitting diode connected in series to said power supply, and said interruption circuit comprises a phototransistor which is turned on in response to emission of light of said light emitting diode, thereby applying an interruption signal to said main control device.

8. The electrical discharge machining system of claim 7, wherein said light emitting diode and said phototransistor are disposed at a distance from each other, the light of said light emitting diode being transferred to said phototransistor through an optical fiber.

9. The electrical discharge machining system of claim 1, further comprising a wire supply device to supply said metallic wire, an upper and a lower electrode guide for guiding said metallic wire to and from said workpiece, respectively, along said feed pateh, and a wire take-up device to take up said metallic wire, relative positions of said upper and lower electrode guides being adjustable along mutually perpendicular X and Y axes in a horizontal plane, the electrical discharge machining of the workpiece being effected at a portion of said metallic wire which extends between said upper and lower electrode guides.

10. The electrical discharge machining system of claim 9, further comprising:

a work table movable along said X and Y axes;

a first and a second verticality sensing member supported by said work table so as to check for the verticality of said portion of the metallic wire, said first and second verticality sensing members having a first and a second pair of sensing surfaces, respectively, each of said first and second pairs consisting of an X-sensing surface and a Y-sensing surface, the two X-sensing surfaces being spaced apart from each other in a vertical plane perpendicular to said X axis, while the two Y-sensing surfaces being spaced apart from each other in another vertical plane perpendicular to said Y axis;

a first verticality checking circuit connected between said first verticality sensing member and said metallic wire, said first verticality checking circuit comprising a power source, and a first verticality detector for sensing a flow of current from said power source through said first verticality sensing member and said metallic wire upon contact thereof; and a second verticality checking circuit connected between said second verticality sensing member and said metallic wire, said second verticality checking circuit comprising said power source, and a second verticality detector for sensing a flow of current from said power source through said second verticality sensing member and said metallic wire upon contact thereof, the verticality of said portion of the metallic wire being established through detection by said first and second verticality detectors upon contact of said metallic wire with said first and second verticality sensing members.

11. The electrical discharge machining system of claim 10, wherein said at least one wire-slack detecting member comprises a first detecting member disposed between said wire supply device and said upper electrode guide, and a second detecting member disposed between said lower electrode guide and said wire take-up device, said wire-disconnection detecting circuit comprising a first and a second wire-disconnection detecting circuit which are connected, via switching means, selectively to said first and second wire-slack detecting members, respectively, and to said first and second verticality sensing members, respectively, said first and second wire-disconnection detecting circuits serving as said first and second verticality checking circuits, respectively.

12. The electrical discharge machining system of claim 9, wherein said power circuit is connected to said metallic wire via said upper and lower electrode guides.

13. The electrical discharge machining system of claim 1, further comprising a wire supply device for supplying said metallic wire, a wire take-up device for taking up said metallic wire, an upper electrode guide disposed between said wire supply device and said workpiece for guiding said metallic wire to said workpiece, and a lower electrode guide disposed between said workpiece and said wire take-up device for guiding said metallic wire from said workpiece;

said power circuit being connected to said metallic wire via at least one of said upper and lower electrode guides.

14. The electrical discharge machining system of claim 3, wherein said power circuit is connected to said metallic wire via said upper and lower electrode guides.

15. A wire cutting type electrical discharge machining system for removing metal by means of an electrical discharge energy between an electrically conductive workpiece and an electrode in the form of a metallic wire, comprising:

a wire supply device to supply a metallic wire;

a wire take-up device to take up said metallic wire and thereby continuously feed the metallic wire lengthwise along a feed path;

a first and a second metallic wire-slack detecting tube disposed along said feed path of the metallic wire such that the metallic wire is passed through said first and second wire-slack detecting tubes, said first detecting tube being disposed between said wire supply device and a workpiece, said second detecting tube being disposed between said workpiece and said wire take-up device, said metallic wire and said detecting tubes being positioned relative to each other such that the metallic wire is held a slight distance away from the detecting tubes while the metallic wire is normally tensioned, but is brought into contact with said detecting tubes when the metallic wire is slacked;

an upper and a lower electrode guide for guiding said metallic wire relative to said workpiece, said upper electrode guide being positioned between said first detecting tube and said workpiece, said lower electrode guide being positioned between said workpiece and said second detecting tube; and at least one wire-disconnection detecting circuit including (a) a power circuit connected between each of said first and second detecting tubes and said metallic wire, said power circuit being connected to said metallic wire at a first and a second position along said feed path, said first position being located between said first detecting tube and said workpiece, said second position being located between said workpiece and said second detecting tube, and (b) a wire-disconnection detector for sensing a flow of current from said power circuit through said metallic wire and at least one of said first and second detecting tubes upon contact of said metallic wire with said at least one of said detecting tubes, said wire-disconnection detector generating a wire-disconnection signal indicative of a disconnection of said metallic wire when said flow of current is sensed by said wire-disconnection detector.

16. The electrical discharge machining system of claim 15, wherein said power circuit is connected to said metallic wire via said upper and lower electrode guides.

* * * * *